(No Model.)
W. M. WHITING.
Method of and Means for Clasping Belts.
No. 232,428. Patented Sept. 21, 1880.
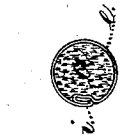
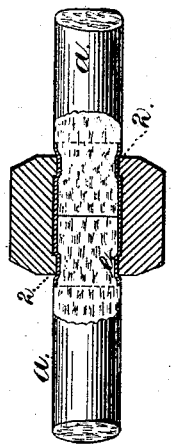
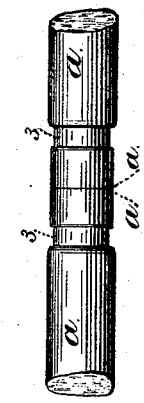
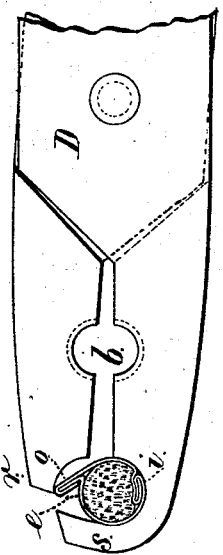
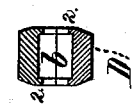
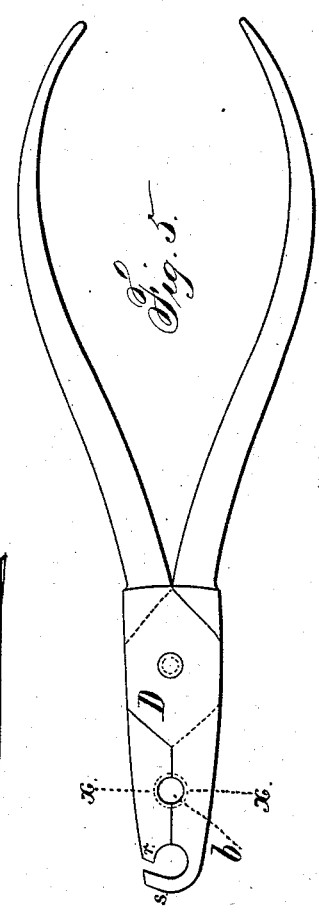
Witnesses
Harold Serrell
Geo. S. Pinckney
Inventor
William M. Whiting
per Lemuel W. Serrell
Atty.
N. PETERS, PHOTO-LITHOGRAPHER, WASHINGTON, D.C.

UNITED STATES PATENT OFFICE.

WILLIAM M. WHITING, OF ELIZABETH, NEW JERSEY, ASSIGNOR TO RACHEL L. WHITING, OF SAME PLACE.

METHOD OF AND MEANS FOR CLASPING BELTS.

SPECIFICATION forming part of Letters Patent No. 232,428, dated September 21, 1880.

Application filed May 31, 1880. (No model.)

*To all whom it may concern:*

Be it known that I, WILLIAM M. WHITING, of Elizabeth, in the State of New Jersey, have invented an Improved Method of and Means for Clasping Belts, of which the following is a specification.

This belt-clasp is specially adapted to the round leather belts used for sewing-machines. The clasp holds the belt by means of inward annular ribs that confine the leather near the ends, the clasp itself being of sheet metal and of the same or a less diameter than the belt.

My improvement relates to the method of uniting the belt by pressing into the sheet metal the annular ribs to confine the belt after the ends of the belt have been inserted into the tubular clasp. It is generally preferable to compress into the material of the belt annular grooves before the tubular clasp is applied, so that the inward annular ribs may be pressed into such grooves. For this purpose I employ pinchers that are made with semi-cylindrical recesses in opposite faces of the jaws, and there are inwardly-projecting ribs near the ends of such recesses, so that the ends of the belt may be compressed, and also ribs formed that press into the belt after the ends of such belt have been inserted into the tubular clasp.

When the tubular clasp is made of a sheet-metal strip with the ends folded together, it is preferable to use pinchers that have a hook at the end of one jaw, between which hook and the end of the other jaw there is a circular opening. This is used for closing the sheet-metal strip around the ends of the belt; but where the clasp employed is a tube, the hook end of the jaw of the pinchers is not needed.

In the drawings, Figure 1 represents the belt with the clasp upon it. Fig. 2 is a cross-section of the same. Fig. 3 shows the leather belt compressed, ready to receive the clasp. Fig. 4 is a partial section longitudinally of the belt, with the clasp upon it, and the tool by which it is compressed. Fig. 5 is a view of the nippers that are used. Fig. 6 is a cross-section of the same at *x x;* and Fig. 7 is a side view of the jaws of the nippers used for the belt, Figs. 1, 2, 3, and 4. Figs. 5 and 6 are smaller nippers than in Fig. 7.

The ends of the belt *a* are to be cut off square, and each end is introduced into the semi-cylindrical recesses *b* in the pinchers or nippers D, such recesses having inward ribs 2 2 at or near the ends, so that when the end of the belt is inserted into such recesses *b* about half the length of such recesses, and the belt squeezed and partially revolved between each compression, the leather or other material composing the belt will be compressed with an annular groove, 3, and when both ends of the belt have been thus compressed they will be in the form indicated in Fig. 3.

I make use of a sheet-metal clasp, *e,* of an internal size to correspond to the compressed end of the belt, and of an external size corresponding, or nearly so, to the diameter of the round belt. This clasp may be a tube; but I prefer to use a strip of metal that is rolled up into a cylindrical form and the ends interlocked, as shown at *i,* Figs. 2 and 7; or a second interlock may be used, as at *o,* Fig. 7, the clasp being made of two pieces of sheet metal.

After the ends of the belt have been placed within the tubular clasp they are held by closing or compressing the tubular clasp within the hook-ended portions *s r* of the pinchers D. If the tubular strip is used the fold remains between the parts *r* and *s,* and is compressed at the same time that the other portion of the clasp is compressed; then this folded portion is closed down, as illustrated in Fig. 7, after which the clasp is placed within the recessed portions *b* of such nippers and squeezed with sufficient force to compress the tubular clasp and make it smaller than the belt, and at the same time press thereinto the annular grooves or inward projections, which, entering the annular grooves 3, hold the ends of the belt together with great firmness.

The belt is not injured by the compressing action, and the clasp is inexpensive, and may be opened, so as to remove it when the belt requires to be shortened; but if the amount that the belt requires to be shortened is as great as the length of the clasp the belt will be cut off at each end of the clasp and a new clasp made use of.

The hand-pinchers D are a convenient means for applying this belt-clasp and are not expensive to manufacture.

I remark that this clasp is especially adapted to the small round belts used on sewing-machines.

If desired, the tubular clasp may be made with inward grooves toward the ends to lessen the force that has to be exerted by the pinchers in applying the clasp to the belt.

I claim as my invention—

1. The method of uniting the ends of round belts consisting in inserting the ends of the belt into a tubular clasp and compressing peripheral grooves into the tube near the ends to clamp and hold the belt, substantially as specified.

2. The method of uniting the ends of round belts consisting in compressing the belt near each end and forming peripheral recesses and then inserting the ends of the belt into a tubular clasp and compressing the tube into the recesses and holding the ends of the belt, as set forth.

3. The belt-clasp pinchers D, having the semicircular recesses $b$ and inward ribs 2 near the ends of the recesses, for the purposes and as set forth.

Signed by me this 29th day of May, A. D. 1880.

WM. M. WHITING.

Witnesses:
GEO. T. PINCKNEY,
WILLIAM G. MOTT.